United States Patent
Zimba et al.

(10) Patent No.: US 8,102,978 B2
(45) Date of Patent: *Jan. 24, 2012

(54) STORAGE-ENABLED FACILITIES

(75) Inventors: Stephan P. Zimba, Kennesaw, GA (US);
Joseph L. Aultman, Sr., Pelham, AL
(US); Stefan Olsson, Birmingham, AL
(US); John Blake Slemmer, Dunwoody,
GA (US); Chris Parsons, Oakton, VA
(US); James A. Nichols, Alpharetta, GA
(US)

(73) Assignee: AT&T Intellectual Property I, L.P.,
Atlanta, GA (US)

( * ) Notice: Subject to any disclaimer, the term of this patent is extended or adjusted under 35 U.S.C. 154(b) by 38 days.

This patent is subject to a terminal disclaimer.

(21) Appl. No.: 12/576,308

(22) Filed: Oct. 9, 2009
(Under 37 CFR 1.47)

(65) Prior Publication Data

US 2010/0268744 A1    Oct. 21, 2010

Related U.S. Application Data

(63) Continuation of application No. 10/875,712, filed on Jun. 24, 2004, now Pat. No. 7,657,008, which is a continuation of application No. 10/218,481, filed on Aug. 14, 2002, now abandoned.

(51) Int. Cl.
*H04M 1/64* (2006.01)

(52) U.S. Cl. ............. 379/88.25; 379/88.13; 705/26

(58) Field of Classification Search ............ 379/88.19, 379/88.13, 88.25; 370/353, 352; 709/227; 705/14.23

See application file for complete search history.

(56) References Cited

U.S. PATENT DOCUMENTS

| | | | |
|---|---|---|---|
| 6,061,502 A | 5/2000 | Ho et al. | |
| 6,064,880 A | 5/2000 | Alanara | |
| 6,247,046 B1 | 6/2001 | Yanai et al. | |
| 6,529,500 B1 | 3/2003 | Pandharipande | |
| 6,640,242 B1 | 10/2003 | O'Neal et al. | |
| 6,831,966 B1 | 12/2004 | Tegan et al. | |
| 6,904,038 B1 * | 6/2005 | Moon et al. | 370/353 |
| 7,010,493 B2 * | 3/2006 | Yamamoto et al. | 705/32 |
| 7,075,919 B1 * | 7/2006 | Wendt et al. | 370/352 |
| 2002/0019225 A1 | 2/2002 | Miyashita | |
| 2002/0049778 A1 | 4/2002 | Bell et al. | |
| 2002/0099826 A1 * | 7/2002 | Summers et al. | 709/227 |
| 2002/0152181 A1 * | 10/2002 | Kanai et al. | 705/80 |
| 2003/0018522 A1 * | 1/2003 | Denimarck et al. | 705/14 |
| 2003/0113059 A1 | 6/2003 | BuAbbud | |
| 2004/0196966 A1 * | 10/2004 | Bushnell | 379/88.19 |
| 2005/0071443 A1 | 3/2005 | Menon et al. | |

* cited by examiner

*Primary Examiner* — Md S Elahee
(74) *Attorney, Agent, or Firm* — Scott P. Zimmerman PLLC

(57) ABSTRACT

Methods, systems, and apparatuses are disclosed for enabling network facilities with data storage capability. A data connection is established to a storage device. Customer-defined electronic data is communicated to the storage device via the data connection. At least some of the electronic data may be managed according to a service level agreement.

19 Claims, 14 Drawing Sheets

STORAGE-ENABLED FACILITIES

CROSS-REFERENCE TO RELATED APPLICATIONS

This application is a continuation of U.S. application Ser. No. 10/875,712, filed Jun. 24, 2004, and now issued as U.S. Pat. No. 7,657,008, which is a continuation of U.S. patent application Ser. No. 10/218,481, filed Aug. 14, 2002, and now abandoned, with both applications incorporated herein by reference in their entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to computers and to telephony and, more particularly, to methods and systems that allow a customer to manage electronic data in a storage-enabled telecommunications network.

2. Description of the Related Art

The explosive growth of electronic data presents storage problems. As more and more businesses and residences embrace information technology, businesses and residences are confronted with the problem of storing more and more electronic information. Businesses, for example, generate thousands of electronic documents, emails, proprietary information, and the like each day. The pressing challenge is how businesses may store and manage this growing electronic data without investing millions of dollars in hardware and equipment, network infrastructure, maintenance, and training. There is, accordingly, a need in the art for a storage service that reduces a customer's investment in data storage networks.

BRIEF SUMMARY OF THE INVENTION

The aforementioned problem, and other problems, are reduced by a storage-enabled telecommunications network. This storage-enabled telecommunications network comprises a shared, interconnected network of secure storage facilities provided by a telecommunications service provider. This network of secure storage facilities leverages the assets of a telecommunications network to create a fabric of storage points of presence (or "POPs"). These storage POPs are then deployed throughout the telecommunications network to provide data storage service to a range of customers, from large corporations to individual consumers. The storage-enabled telecommunications network allows a customer to manage electronic data residing on one or more storage POPs, thus providing redundant, off-site secure data storage for medical records, legal records, trade secrets, confidential/proprietary information, and other electronic information. The storage-enabled telecommunications network may also be used to stream data, such as digital movies, digital music, and other content, to customers.

One aspect of this invention describes a method for storing electronic data. Telecommunications service and data storage service is provided to a customer. The data storage service stores the electronic data within a network of shared, interconnected storage devices. The network of storage devices is provided by a telecommunications service provider. The data storage service allows the customer to store, delete, retrieve, copy, and otherwise manage the electronic data remotely residing in the storage network. At least one storage device in the network of storage devices is associated with a central office ("CO"), a mobile telephone switching center ("MTSO"), or a combination CO/MTSO.

Another embodiment describes an alternative method for managing electronic data. This method communicates electronic data to a storage device. The storage device is associated with a telecommunications facility, such as a central office and/or a mobile telephone switching office.

Still another embodiment describes yet another method for managing electronic data. A data connection is established to a storage device. The storage device is associated with a telecommunications network facility. Customer-defined electronic data is communicated to the storage device via the data connection. At least some of the electronic data is managed according to a service level agreement.

Yet another embodiment is a system for remotely managing electronic data. The system comprises a network of storage devices, a storage operating system, and an application program. The network of storage devices is provided by a telecommunications service provider. The network of storage devices comprises a plurality of shared, interconnected storage devices. The storage operating system manages the network of storage devices. The application program may be installed in a customer's computer, and the application program allows the customer to manage electronic data remotely residing in the network of storage devices.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

This invention utilizes a telecommunications network facility as a storage facility. A storage device is associated with the telecommunications network facility, and a customer may then store their electronic data to the storage device. If, for example, the storage device is associated with a central office serving the customer, the customer's electronic data may be archived to the storage device in the central office. The customer's electronic data is then archived in a secure facility designed to withstand many natural and man-made disasters.

This invention also describes a storage-enabled telecommunications network. If storage devices are located in various telecommunications network facilities, then these facilities may be meshed together as a storage network. A customer, then, could store electronic data to the local central office, and this electronic data itself could be archived to another telecommunications network facility. If a customer located in Miami, Fla. wants to archive electronic data geographically outside "hurricane alley," the customer's electronic data could be transferred along the storage network to a safer telecommunications network facility. The customer's electronic data, for example, could be transferred from a central office in Miami to a telecommunications network facility in Tennessee. The customer's electronic data could automatically be "mirrored" from one telecommunications network facility to another to protect against fire or other disaster. If a disaster did strike the customer's local telecommunications network facility, then the customer's data connection to the storage network could be re-routed to the mirrored storage facility.

Figure 1:
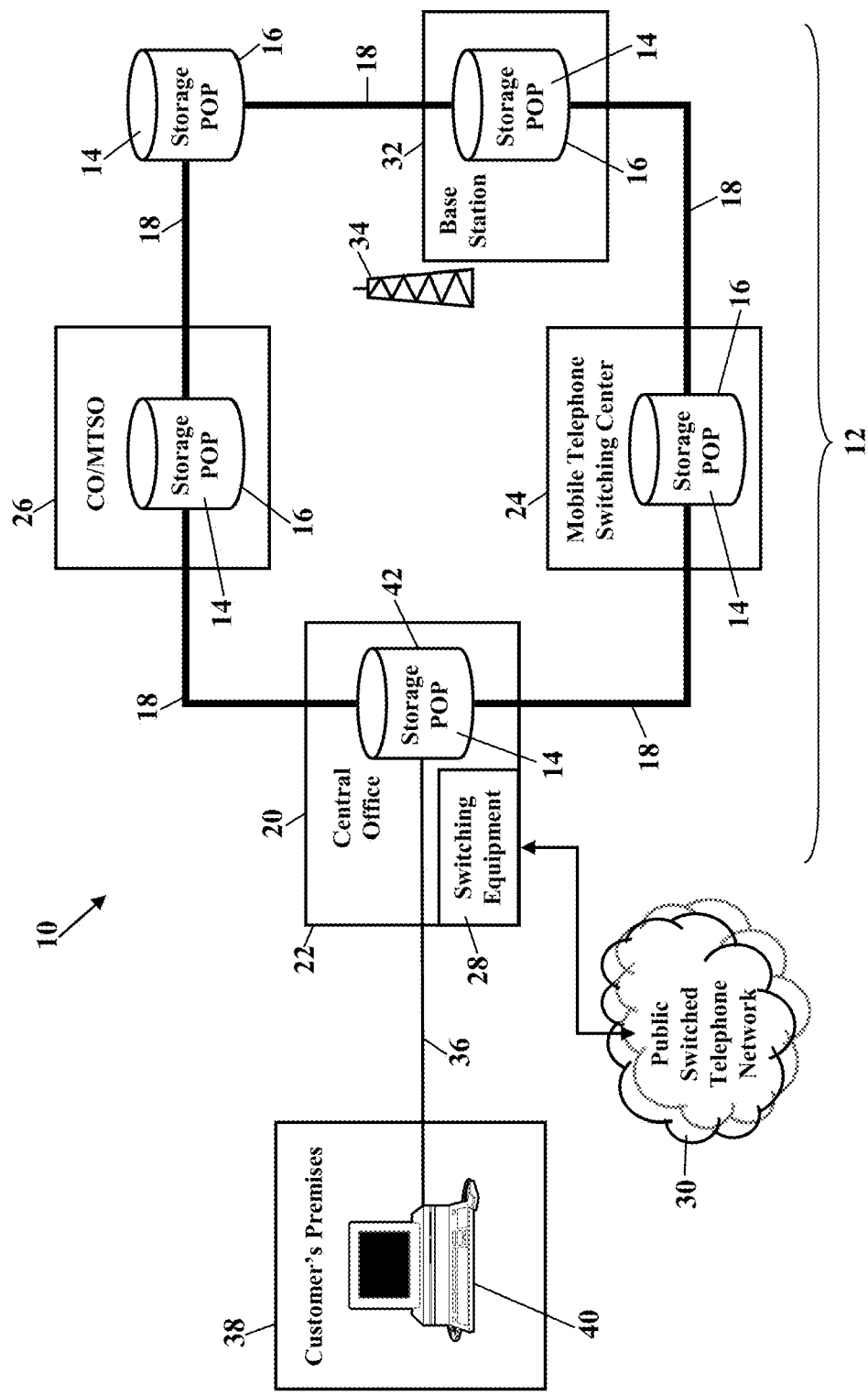
FIG. 1 is a schematic showing an exemplary operating environment for a storage-enabled telecommunications network according to an embodiment of this invention.

FIG. 1 is a schematic showing an exemplary operating environment for a storage-enabled telecommunications network 10. The storage-enabled telecommunications network 10 comprises a shared, interconnected network 12 of one or more storage points of presence (or "POP") 14. Each storage point of presence (or "POP") 14 has a storage device 16 for storing electronic data. Each storage device 16 comprises any medium capable of storing electronic data, yet each storage device 16 preferably comprises a magnetic, optical, or tape drive. Each storage POP 14 may also communicate electronic data to another storage POP via a network transport 18. The network transport 18 comprises interconnections amongst the storage POPs 14 to communicate electronic data along the network 12. The network transport 18 may be any means of coupling one storage POP to another storage POP, but the network transport 18 is preferably high-capacity, high-bandwidth optical transport services and/or Gigabit Ethernet services. The network transport 18 could also link each storage POP 14 via a Synchronous Optical Network (SONET) structure with redundant, multiple rings.

The storage-enabled telecommunications network 10 also includes a telecommunications network facility 20. At least one storage POP 14 is associated with the telecommunications network facility 20, such as a central office (CO) 22, a mobile telephone switching office (MTSO) 24, and/or a combination CO/MTSO 26. As those of ordinary skill in the art of telecommunications understand, the central office (CO) 22, the mobile telephone switching office (MTSO) 24, and the combination CO/MTSO 26 could each comprise switching equipment 28 that communicates with a Public Switched Telephone Network 30. The switching equipment 28 could include Advanced Intelligent Network (AIN) componentry. The switching equipment 28 could also include a packet-based "softswitch" that uses software control to provide voice, data, and video services by dynamically changing its connection data rates and protocols types.

The storage-enabled telecommunications network 10 may also include other telecommunications network facilities. The telecommunications network facility 20 could be a base station facility 32 or an antenna facility 34 of a mobile telephone network. The telecommunications network facility 20 could also be any building, site, or structure that comprises, that contains, or that houses telecommunications equipment, such as a cross-connect box or a utility pole. Because at least one storage POP 14 is associated with the telecommunications network facility 20, the term "associated with" preferably means the storage POP 14 is located within the central office 22 or within the mobile telephone switching center 24. The central office 22, the mobile telephone switching center 24, or the combination CO/MTSO 26 provides a secure site that may withstand natural and man-made disasters. The term "associated with," however, could also mean the storage POP 14 is located within a fenced perimeter of the telecommunications network facility 20, or the storage POP 14 is located on the property grounds of the telecommunications network facility 20. The term "associated with" could also mean the storage POP 14 is located on a roof of the telecommunications network facility 20, within the owned or leased premises of the base station facility 32, or within the owned or leased premises of the antenna facility 34.

FIG. 1 also shows that a customer may interact with the storage-enabled telecommunications network 10. A data connection 36 is established to a storage POP 14 and, thus, to a storage device 16. This data connection 36 allows electronic data to be sent and received via the data connection 36. The data connection 36, for example, couples the customer's premises 38, such as a home or business, with a storage POP 14 and the storage device 16. If a computer 40 operating within the customer's premises 38 is coupled to the data connection 36, the customer may use the computer 40 to access the storage device 14 and to communicate electronic data. FIG. 1 shows the computer 40 coupled to a storage device 42 operating within the central office 22. Because the storage device 42 is also interconnected with each storage POP 14 via the network transport 18, the customer could also have permission to access any other storage POP 14 within the storage-enabled telecommunications network 10. The data connection 36 comprises any means of coupling the customer's premises 38 to the storage POP to communicate electronic data. The means of coupling the customer's premises 38 to the storage POP includes optical transmission of electronic data, wireless transmission of electronic data, and/or fixed-wire transmission of electronic data. Fiber optic technologies, spectrum multiplexing (such as Dense Wave Division Multiplexing), Ethernet and Gigabit Ethernet services, and Digital Subscriber Lines (DSL) are just some examples of the means of coupling the customer's premises 38 to the storage POP to communicate electronic data. The means of coupling the customer's premises 38 to the storage POP could also include a fixed wire connection to the storage POP 14 via a local loop of a telecommunications network to communicate electronic data.

Because at least one storage POP 14 is associated with the telecommunications facility 20, a telecommunications service provider is able to offer a storage service to the customer. This storage service allows the customer to manage electronic data stored within the storage-enabled telecommunications network 10. The customer, for example, uses the computer 40 to access the storage device 42 associated with the central office 22, and the customer sends and receives electronic files, movies, music, and other electronic data. When the customer manages electronic data residing within the storage-enabled telecommunications network 10, the term "manage" means the customer may (i) store electronic data to the storage device 42, (ii) retrieve electronic data from the storage device 42, (iii) delete electronic data from the storage device 42, and (iv) protect electronic data residing on the storage device 42. The term "manage" also means the customer may (v) send electronic data to a destination outside the network 12 of storage devices and (vi) archive electronic data on the storage device 42 or on any other storage device 16 communicating with the network 12. The term "manage" also means the customer may (vii) send electronic data to, and receive electronic data from, any Internet Protocol address on a distributed computing network (such as the Internet). "Manage" electronic data also means the customer may (viii) encrypt electronic data that is sent to, received from, or transmitted within the network 12, (ix) copy electronic data transmitted to, from, or within the network 12, (vi) and associate electronic data with other electronic data transmitted to, from, or within the network 12. This storage service may also permit the customer to save, delete, copy, retrieve, protect/encrypt, archive, and, in general, "manage" electronic data residing within the storage device 42, residing within any other storage device 14 communicating with the network 12, and residing within the network 12.

Figure 2:
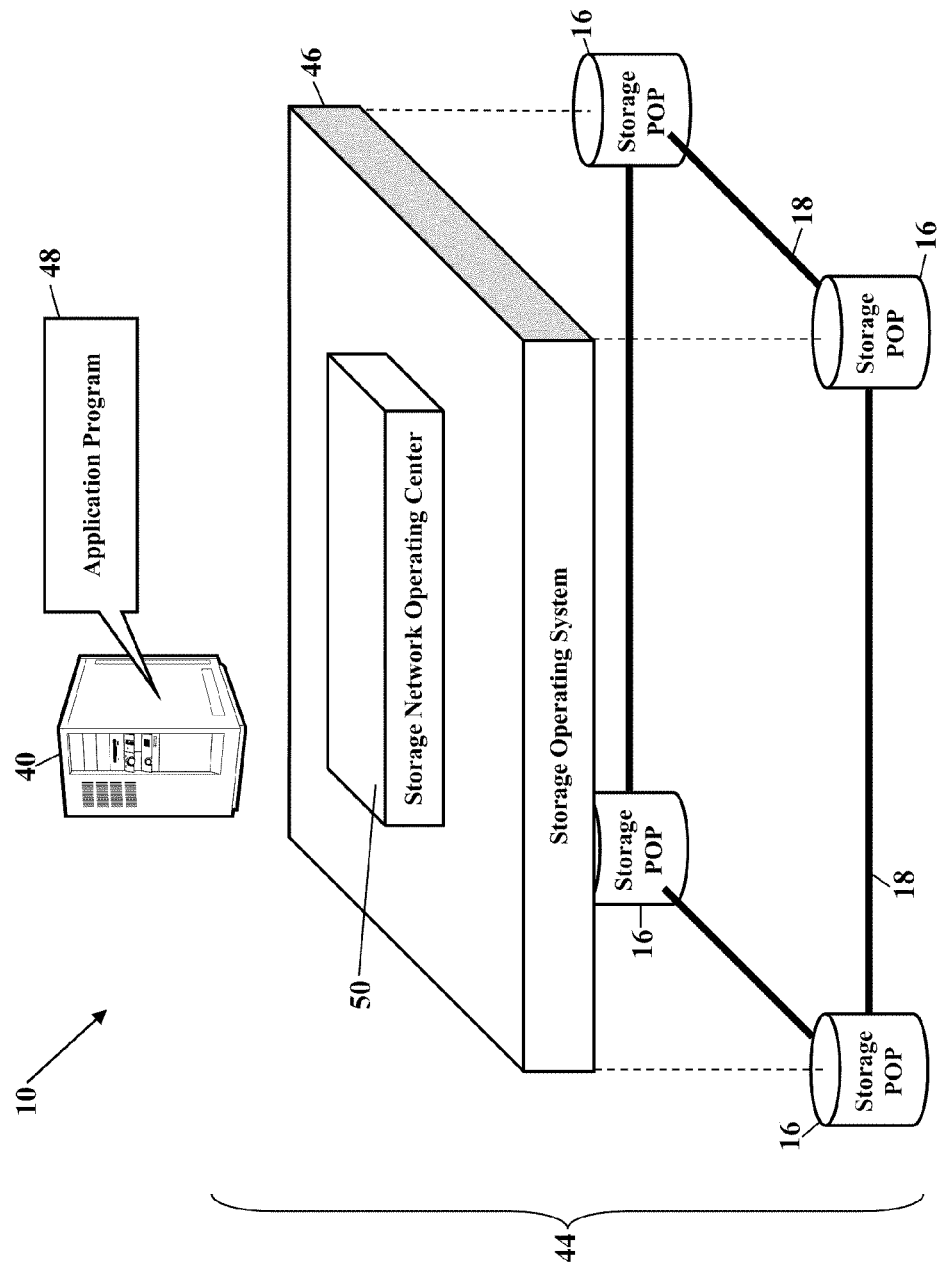
FIG. 2 is a schematic showing a framework for the storage-enabled telecommunications network according to an embodiment of this invention.

FIG. 2 is a schematic showing a framework 44 for the storage-enabled telecommunications network 10. This framework 44 comprises four (4) layers: the network transport 18, the storage devices 16, a storage operating system 46, and an application program 48. The fourth layer, the network transport 18, comprises any means of coupling one storage device to another storage device to communicate electronic data. The means of coupling one storage device to another storage device includes optical transmission of electronic data, wireless transmission of electronic data, and/or fixed-wire transmission of electronic data. Fiber optic technologies, spectrum multiplexing (such as Dense Wave Division Multiplexing), Gigabit Ethernet services, and Digital Subscriber (DSL) Lines are just some examples of the means of coupling one storage device to another storage device to communicate electronic data.

The third layer is the hardware for storing electronic data. Each storage device 16 comprises any medium or device that is capable of storing computer files, digital movies, digital music, and other electronic data. Each storage device 16, however, preferably comprises a magnetic, optical, or tape drive system for storing electronic data. The storage devices 16 are purchased from vendors such as EMC Corporation (35 Parkwood Drive, Hopkinton Mass. 01748, www.emc.com) and IBM Corporation (1133 Westchester Avenue, White Plains N.Y. 10604, www.ibm.com). The storage devices 16 are then interconnected along the network transport 18 to create the network 12 of storage devices.

The second layer is the storage operating system 46. The storage operating system 46 is preferably an off-the-shelf software package that provisions, monitors, manages, and bills for the use of the storage service. The preferred software package is the StorageManager v5.0 product from Storage Networks (Storage Networks, Incorporated, 225 Wyman Street, Waltham Mass. 02451, www.storagenetworks.com). The StorageManager v5.0 product is compatible with various models and manufacturers of storage devices, and the StorageManager v5.0 product allows the storage-enabled telecommunications network to be centrally monitored and managed from a storage network operating center 50. Although the StorageManager v5.0 product is the preferred storage operating system 46, the storage operating system 46 may alternatively be any data storage management application that manages, or provides access to, one or more of the storage devices.

The first layer is the application program 48. One or more application programs operate on the customer's computer 40. The customer's computer 40 may have special software or software agents installed that will allow the storage service to be performed. As the customer manages electronic data residing on a remote storage device 16 (such as the storage device 42 in the central office 22), an application program is executed to provide the management task. If, for example, the customer wishes to archive electronic data to a storage device 16, an archival/backup application program 48 or "agent" communicates with the storage-enabled telecommunications network 10 and executes the archival task. Any other data management task, such as saving, deleting, copying, retrieving, protecting/encrypting, and, in general, "managing," would be executed by one or more application programs or agents. The one or more application programs 48 are installed in the customer's computer 40, and the application programs 48 allow the customer to manage electronic data remotely residing in the storage-enabled telecommunications network 10.

The framework for the storage service may also include a service level agreement. The service level agreement is an agreement between the storage service provider and the customer. The service level agreement commits that the storage service provider will store data under certain parameters. The service level agreement, for example, could specify how an archival operation is performed or how frequently the customer may access the storage service. The service level agreement could also bind the storage service provider to provide archival electronic data within a certain time frame (e.g., 30 minutes or 24 hours).

Figure 3:
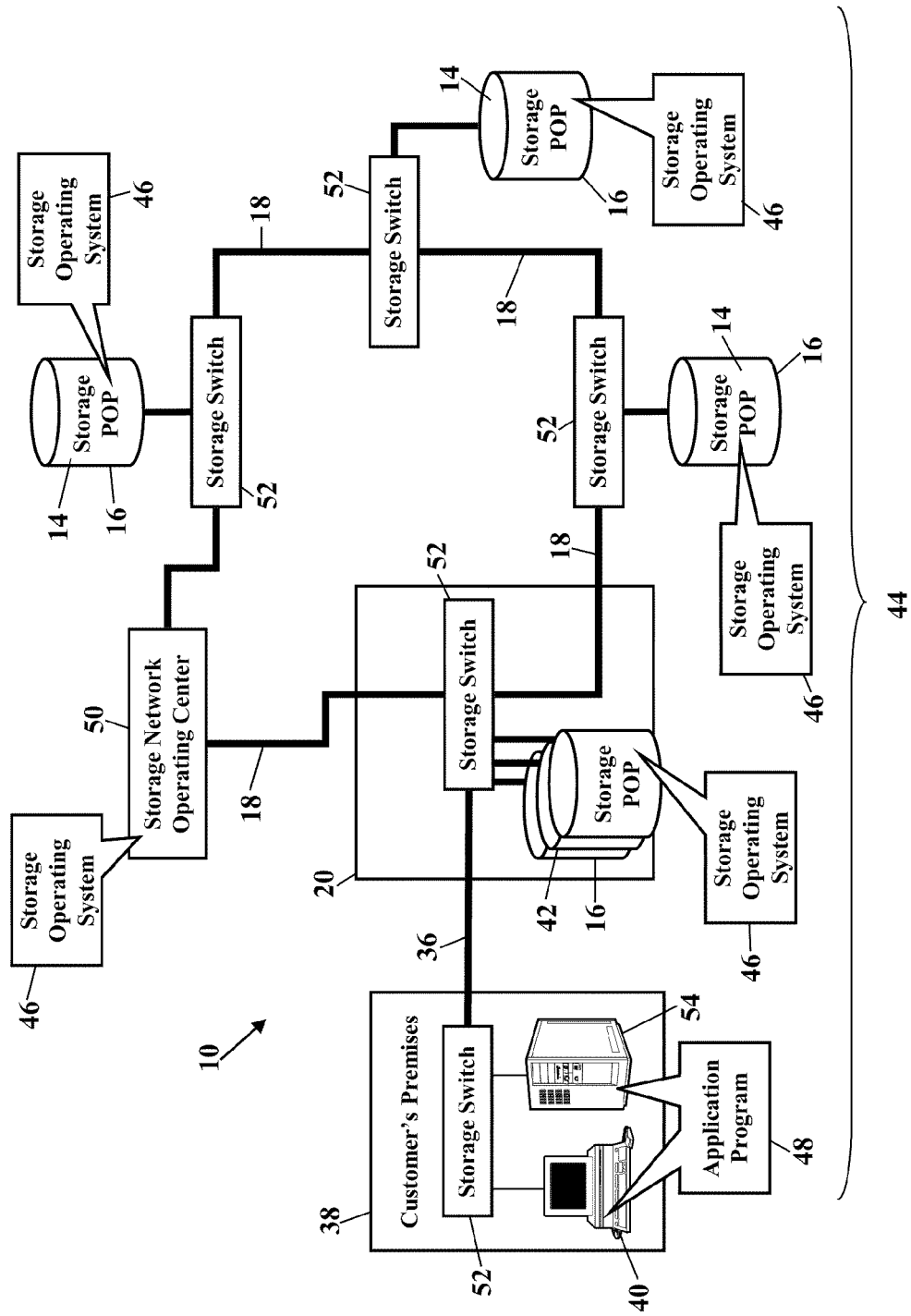
FIG. 3 is a more detailed schematic of the framework shown in FIG. 2.

FIG. 3 is a more detailed schematic of the framework 44 shown in FIG. 2. Each storage POP 14 has one or more storage devices 16, and the network transport 18 interconnects the storage POPs 14 to communicate electronic data along the network (shown as reference numeral 12 in FIG. 1). At least one storage POP 14 is associated with the telecommunications facility 20. The storage operating system 46 operates on each storage device 16, and the storage devices 16 and the storage operating system 46 are centrally monitored from the storage network operating center 50. One or more application programs 48 operate on the customer's computers 40 and also communicate, via the data connection 36 and via the network transport 18, with the storage network operating center 50.

The framework 44 may also include one or more storage switches 52. These storage switches 52 interconnect one or more storage devices 16 operating within a storage POP 14. As FIG. 3 shows, for example, the storage POP 14 associated with the telecommunications network facility 20 may have more than one storage device 16. The storage POP 14, in fact, could have many storage devices 16 depending upon the amount of electronic data to be stored and depending upon the capacity of each storage device 16. The storage switch 52 is then connected to each storage device 16 operating at the storage POP 14, and the storage switch 52 routes electronic data from a shared connection to the proper storage device 16. The network transport 18 then interconnects each storage switch 52 at each storage POP 14, and the storage switch 52 at each storage POP 14 is, in turn, connected to each storage device 16 operating at each storage POP 14. The interconnected storage switches 52 thus allow the storage devices 16, operating at each storage POP 14, to share the network transport 18.

The customer's premises 38 may also include a storage switch 52. If the data connection 36 to the customer's premises 38 is shared between one or more networked computers 40, and/or a network-attached storage system 54, then a storage switch 52 is also operating at the customer's premises 38. The storage switch 52 connects to the customer's network and routes electronic data from the shared data connection 36 to the proper networked storage device. The data connection 36 is thus established between the customer's premises 38 and the storage POP 14, and electronic data is sent and received via the data connection 36.

The storage network operating center 50 monitors the storage switches 52. As FIG. 3 shows, the storage network operating center 50 is interconnected to each storage switch 52 via the network transport 18. The storage network operating center 50 may then monitor each storage switch 52 and observe performance, packet flows, status, errors, and other operational indicators for each storage switch 52. Because each storage switch 52 is also interconnected to each storage device 16 operating at each storage POP 14, the storage network operating center 50 also monitors the performance and the operation of each storage device 16. The storage network operating center 50 would also be able to monitor the storage switch 52 operating at the customer's premises 38, so the storage network operating center 50 may also know the performance and the operation of the customer's networked computers 40 and/or the network-attached storage system 54. The storage network operating center 50 also runs the storage operating system 46 common to all storage devices 16, so the storage network operating center 50 could remotely diagnose and repair problems.

Figure 4:
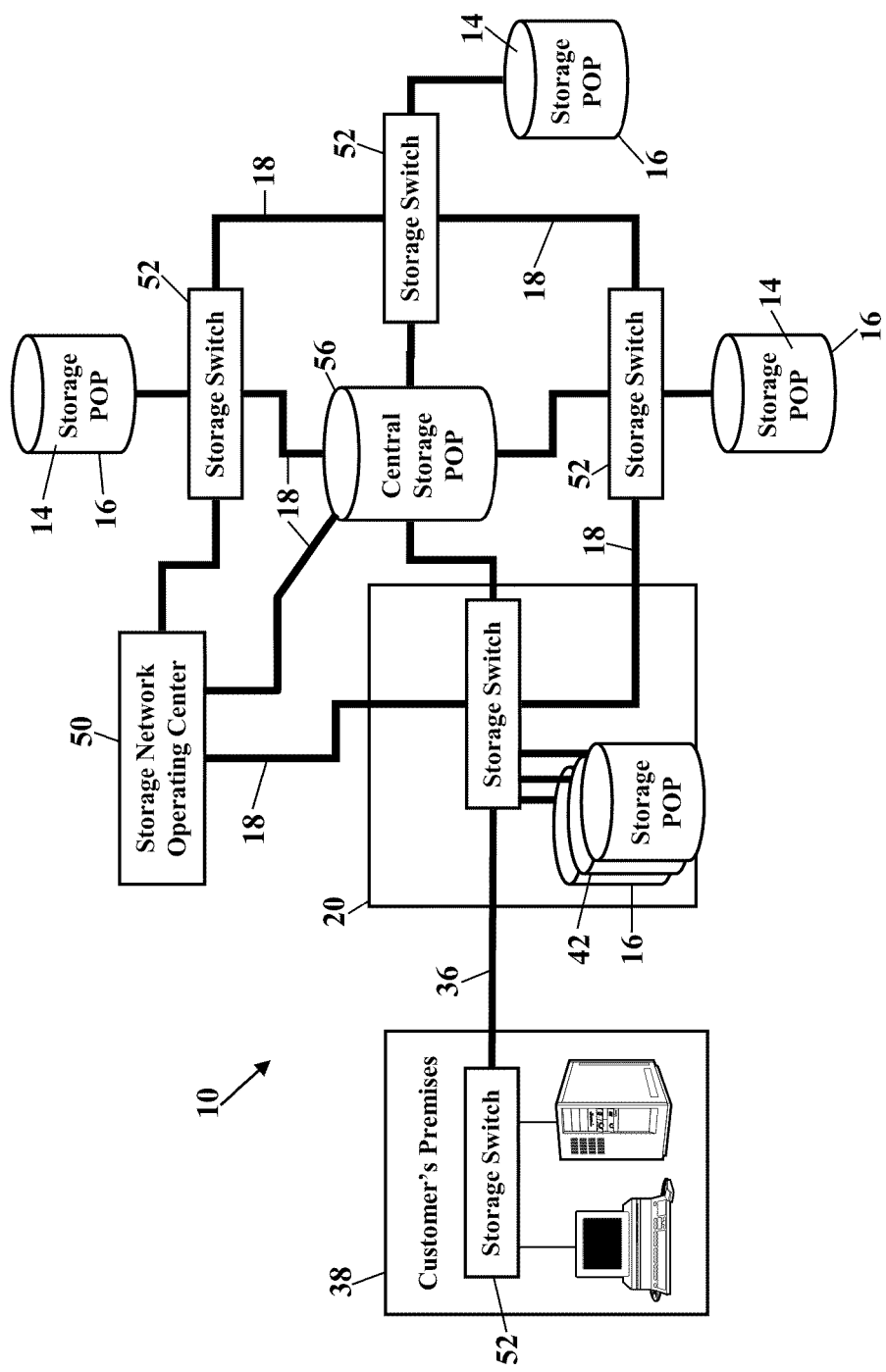
FIG. 4 is a schematic showing another embodiment of the storage-enabled telecommunications network.

FIG. 4 is a schematic showing another embodiment of the storage-enabled telecommunications network 10. Here the storage-enabled telecommunications network 10 includes a central storage POP 56. The central storage POP 56 is also interconnected to each storage POP 14 via the network transport 18. The central storage POP 56 may be associated with a telecommunications network facility. The central storage POP 56 stores large amounts of electronic data that exceed the capacity, or the performance desires, of the smaller storage POP 14. The central storage POP 56, for example, could be used as a content library and stores digital movies, music, news, and video. When the customer wants to download and receive digital content, such as a digital movie, the digital content is communicated (or "streamed") from the central storage POP 56, to the storage POP 14 communicating with the customer's premises 38, and along the data connection 36 to the customer's premises 38. The customer may then view or listen to the digital content using any device capable of playing or of executing digital content, such as the computer 40.

FIG. 4 also illustrates an alternative embodiment for a fee-based or subscription-based content service. Because the central storage POP 56 may store digital content, customers could be notified when content matches the customer's desires. A content provider, such as DISNEY®, WARNER BROS.®, or BELLSOUTH®, could store/post digital content to the central storage POP 56. A customer profile indicates what content the customer prefers, such as news, sports, classic movies, or pop music. When content is stored, or "posted," to the central storage POP 56, and that content matches the customer's profile, the customer could be notified of that profile-matching content. The customer could then receive or download the profile-matching content. The customer could be charged a fee for the digital content, or the customer could subscribe to the profile-matching content. The digital content could also be freely offered to the customer.

FIG. 4 also illustrates an alternative embodiment for a fee-based storage service. The storage POP 14, or the central storage POP 56, could store a customer's digital music, movies, and other digital content. As digital content becomes more ubiquitous, customers will need to store their digital content. The customer may choose to store their digital content on the storage POP 14 or on the central storage POP 56. The customer could be charged a fee for this storage service.

Figure 5:
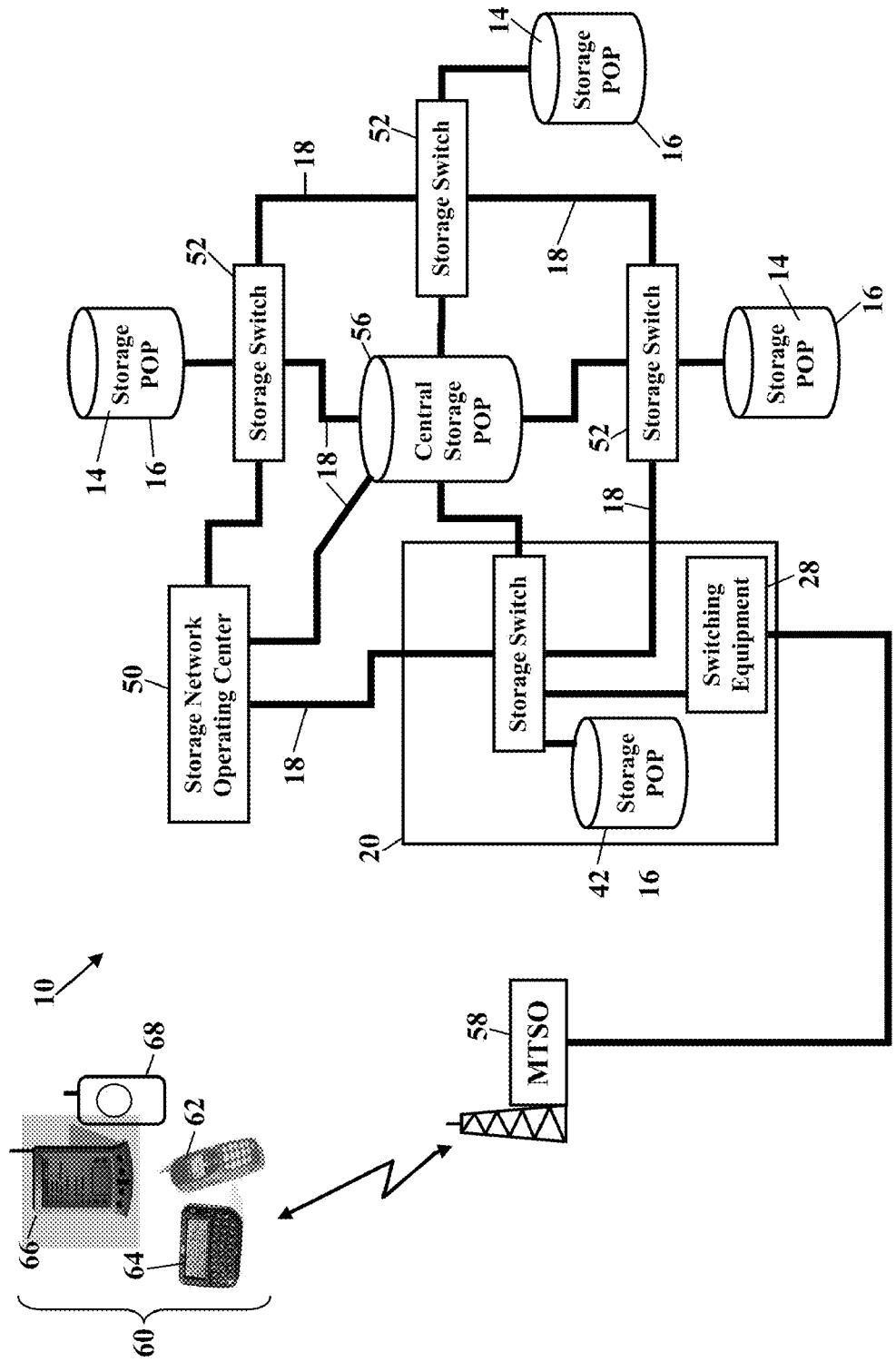
FIG. 5 is a schematic of yet another alternative embodiment for the storage-enabled telecommunications network.

FIG. 5 is a schematic of yet another alternative embodiment for the storage-enabled telecommunications network 10. FIG. 5 shows the storage-enabled telecommunications network 10 may wirelessly communicate electronic data to and from the storage device 42 (or any storage device 16 at any storage POP 14). Electronic data is communicated from the storage device 42, through the storage switch 52, and to the switching equipment 28 associated with the telecommunications network facility 20. The switching equipment 28 routes the electronic data to a mobile telephone switching center 58. The mobile telephone switching center 58 then wirelessly communicates the electronic data to a wireless communications device 60, such as a mobile phone 62, a pager 64, a wireless personal data assistant 66, or a wireless digital music device 68 (such as a wireless.mp3 player). The wireless communications device 60 could also communicate electronic data to the storage device 42 using the same infrastructure. Various standards and technologies could be used to support wireless communication to and from the wireless communications device 60, such as 2G, 2.5G, and 3G cellular techniques. Those of ordinary skill in the art also recognize the same infrastructure could also be used to communicate electronic data to a satellite phone.

Figure 6:
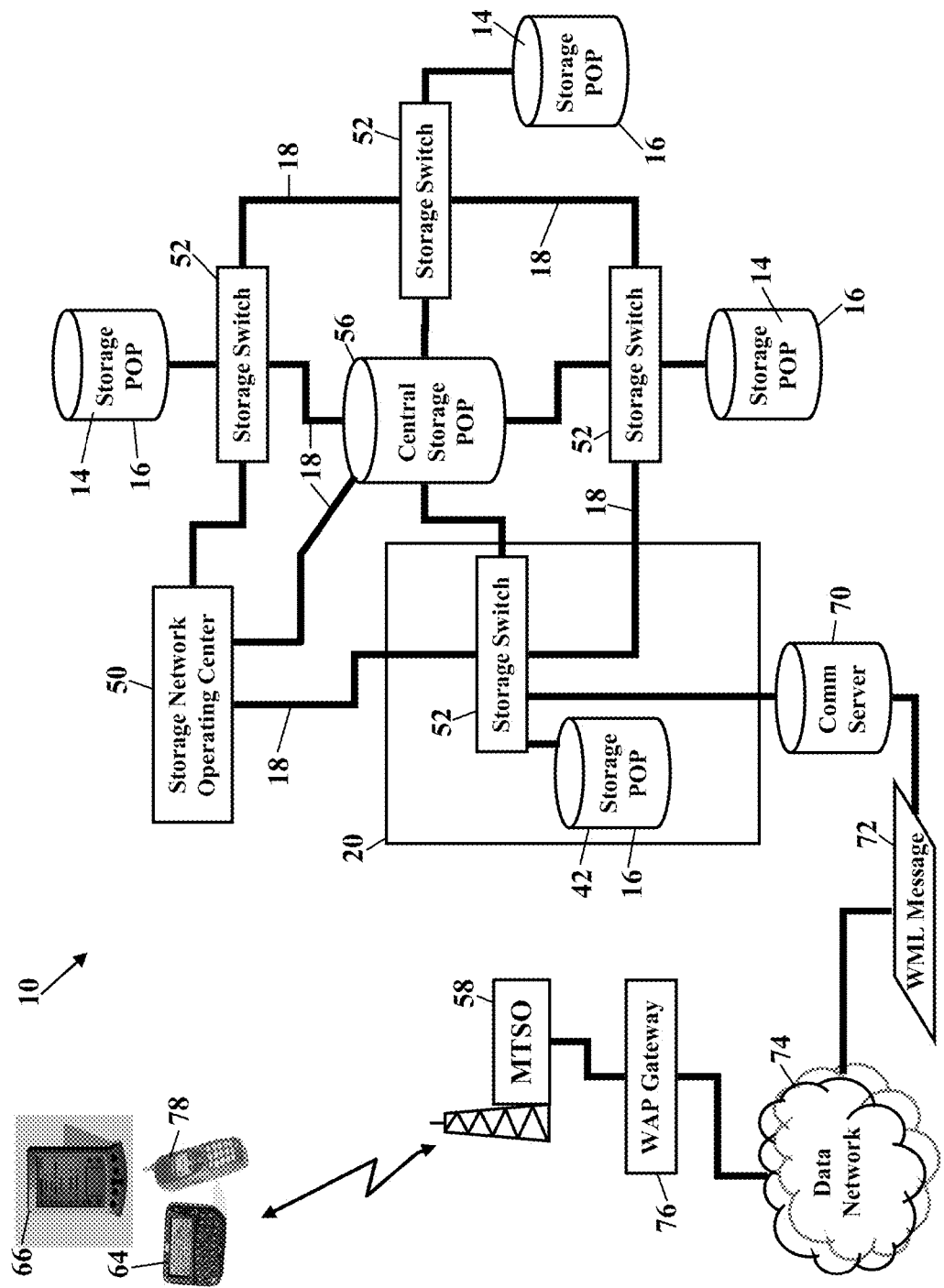
FIG. 6 is a schematic of still another alternative embodiment for the storage-enabled telecommunications network.

FIG. 6 is a schematic of yet another alternative embodiment for the storage-enabled telecommunications network 10. Here the storage-enabled telecommunications network 10 wirelessly communicates electronic data to and from the storage device 42 (or any storage device 16 at any storage POP 14) using the Wireless Application Protocol (WAP) technique. Electronic data is communicated from the storage device 42, through the storage switch 52, and to a communications ("Comm") server 70. The Comm server 70 formats the electronic data into one or more Wireless Mark-up Language (WML) messages 72. The WML messages 72 are then communicated over a data network 74 to a WAP gateway 76. The WAP gateway 76 then interfaces with the mobile telephone switching center 58, and the mobile telephone switching center 58 then wirelessly communicates the electronic data to a WAP phone 78, the pager 64, or the wireless personal data assistant 66. Those of ordinary skill in the art of telecommunications understand the WAP gateway 76 uses a WAP push proxy server to push messages to the WAP phone 78, the pager 64, or the wireless personal data assistant 66. The Wireless Mark-up Language (WML) and the WAP technique are known and will not be further described. This is a description of a solution for a specific wireless protocol, such as WAP. This solution may be clearly extended to other wireless protocol, such as i-mode.

Figure 7:
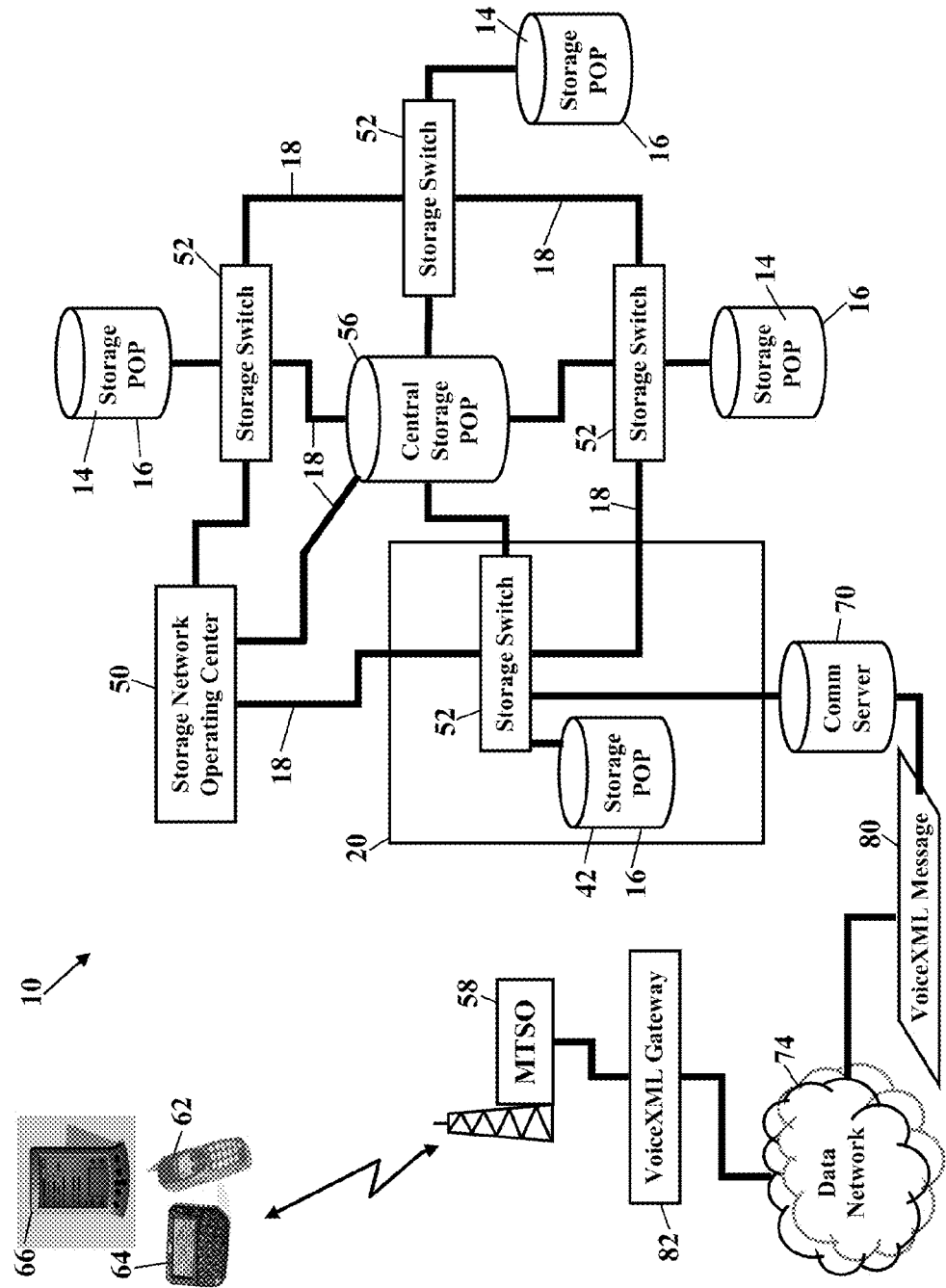
FIG. 7 is another example of wirelessly communicating electronic data to and from a storage device.

FIG. 7 is another example of wirelessly communicating electronic data to and from the storage device 42 (or any storage device 16 at any storage POP 14). Here, however, the wireless technique uses VoiceXML (Voice eXtensible Markup Language). Electronic data is communicated from the storage device 42, through the storage switch 52, and to the Comm server 70. The Comm server 70 formats the electronic data into one or more VoiveXML messages 80. The VoiceXML messages 80 are then communicated over the data network 74 to a VoiceXML gateway 82. The VoiceXML gateway 82 then interfaces with the mobile telephone switching center 58, and the mobile telephone switching center 58 then wirelessly communicates the electronic data to the mobile phone 62, the pager 64, or the wireless personal data assistant 66.

The customer could use Dual Tone Multi-Frequency (DTMF) keys to approve or decline the electronic data. If, for example, the customer wishes to decline electronic data, the customer may transmit a Dual Tone Multi-Frequency (DTMF) key to indicate the customer does not wish to wirelessly receive the electronic data. If the customer prefers to approve the wireless communication of any electronic data, the customer, similarly, may transmit a DTMF key to approve any wireless communication or transmission of electronic data. DTMF signaling is a means of transferring information from the customer through the use of in-band audio tones. Each digit of information is assigned a simultaneous combination of one of a lower group of frequencies and one of a higher group of frequencies to represent each digit or character. Those of ordinary skill in the art of telecommunications understand the VoiceXML gateway 82 enables access to, and modification of, web-based information through a normal voice interface. VoiceXML, in addition, provides for automatic speech recognition and/or text-to-speech communication. VoiceXML, therefore, provides understandable communication between the customer, using the mobile phone 62, the pager 64, or the wireless personal data assistant 66, and an application running on the Comm server 70. The VoiceXML technique, the VoiceXML gateway 82, and the DTMF technique are known and will not be further described.

Figure 8:
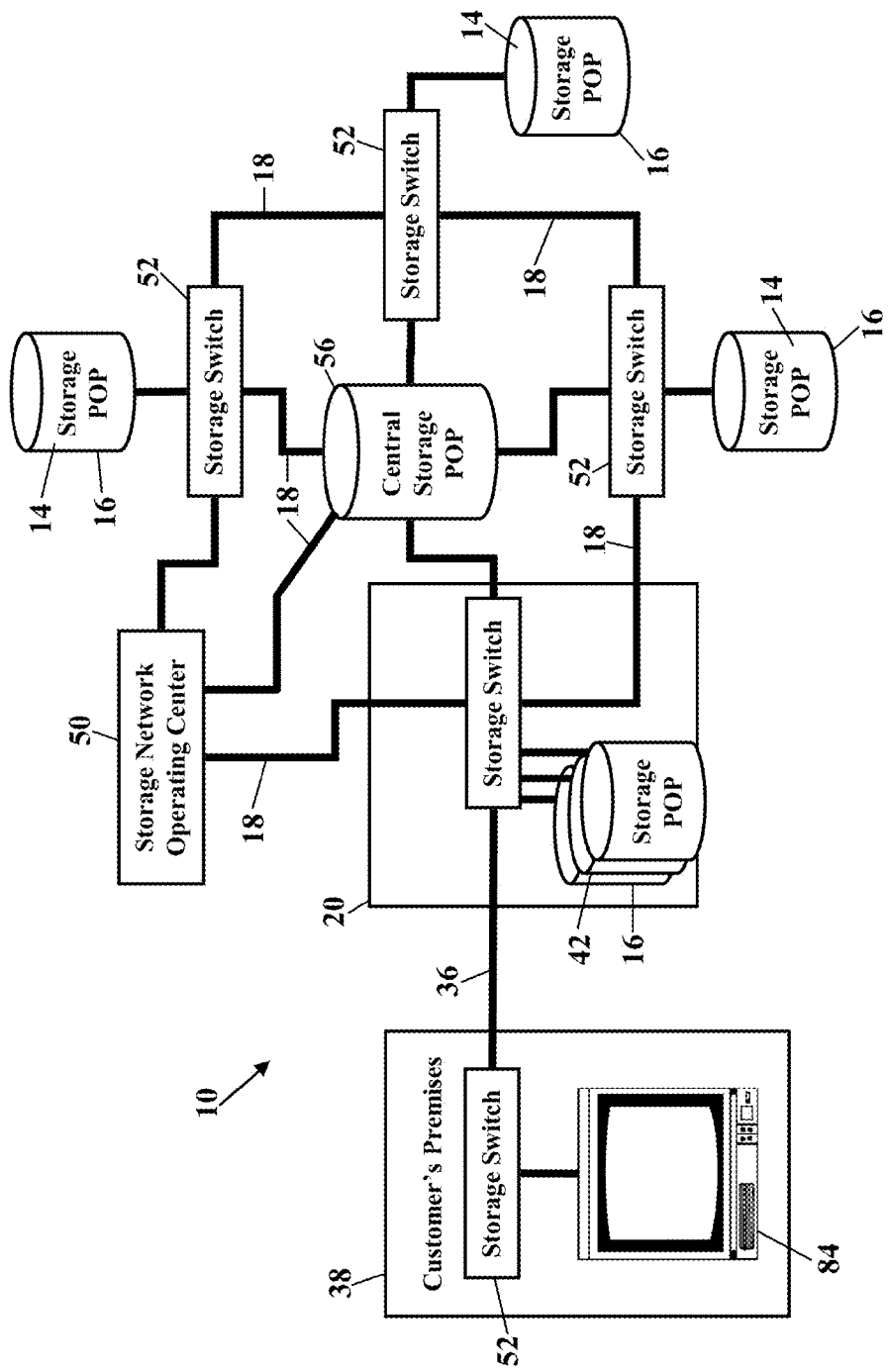
FIG. 8 is a schematic illustrating communication of electronic data to an interactive television.

FIG. 8 is a schematic illustrating communication of electronic data to an interactive television 84. Electronic data is communicated from the storage POP 42, through the storage switch 52, and to the customer's premises 38 via the data connection 36. The electronic data could also be communicated from the central storage POP 56, through the storage switch 52, and to the customer's premises 38 via the data connection 36. If the customer has multiple devices sharing the data connection 36, the electronic data may also be routed through the storage switch 52 at the customer's premises 38. The interactive television 84 couples either to the data connection 36 or to the storage switch 52. The interactive television 84 receives the electronic data and the customer may view the electronic data on the interactive television 84.

Figure 9:
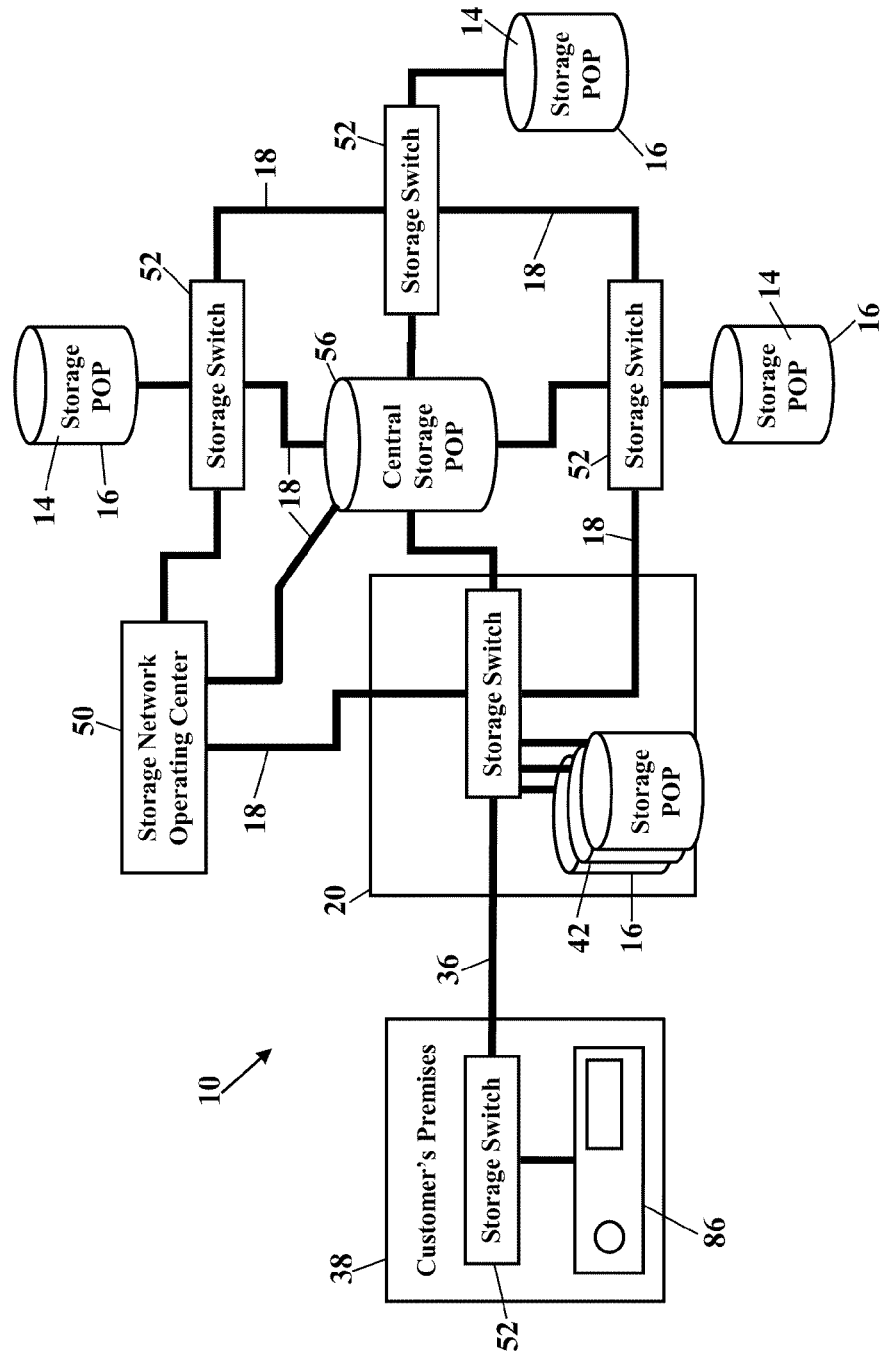
FIG. 9 is a schematic illustrating communication of electronic data to a digital recording device.

FIG. 9 is a schematic illustrating communication of electronic data to a digital recording device 86. The digital recording device 86 digitally stores movies, music, news, and other electronic data. The digital recording device 86 comprises any medium capable of storing electronic data, yet the digital recording device 86 preferably comprises a magnetic, optical, or tape drive. Electronic data is communicated from the storage POP 42, through the storage switch 52, and to the customer's premises 38 via the data connection 36. The electronic data could also be communicated from the central storage POP 56, through the storage switch 52, and to the customer's premises 38 via the data connection 36. If the customer has multiple devices sharing the data connection 36, the electronic data may also be routed through the storage switch 52 at the customer's premises 38. The digital recording device 86 couples either to the data connection 36 or to the storage switch 52. The digital recording device 86 receives the electronic data and stores the electronic data for later use.

Figure 10:
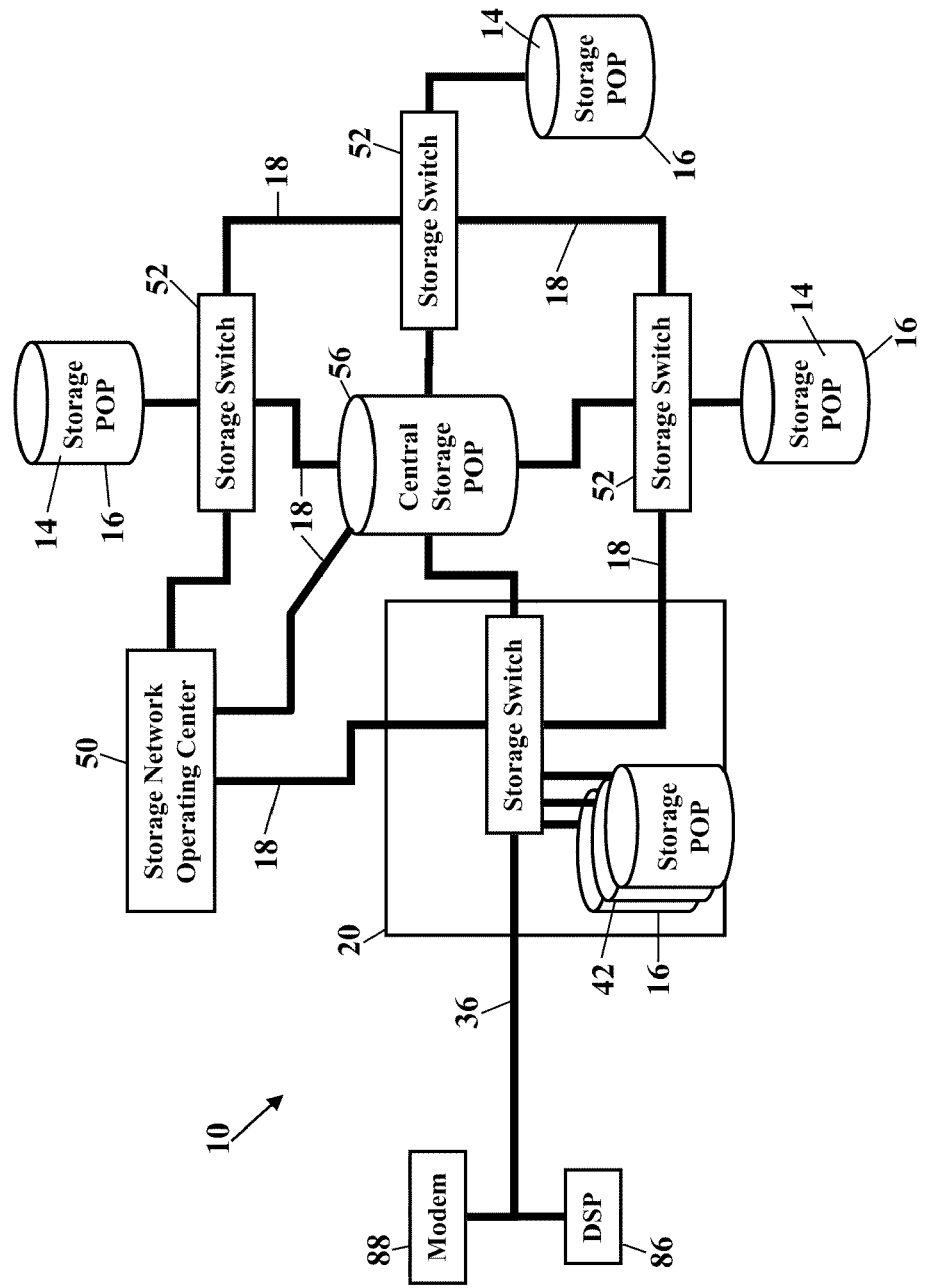
FIGS. 10 and 11 are schematics illustrating the communication of electronic data to other devices.
Figure 11:
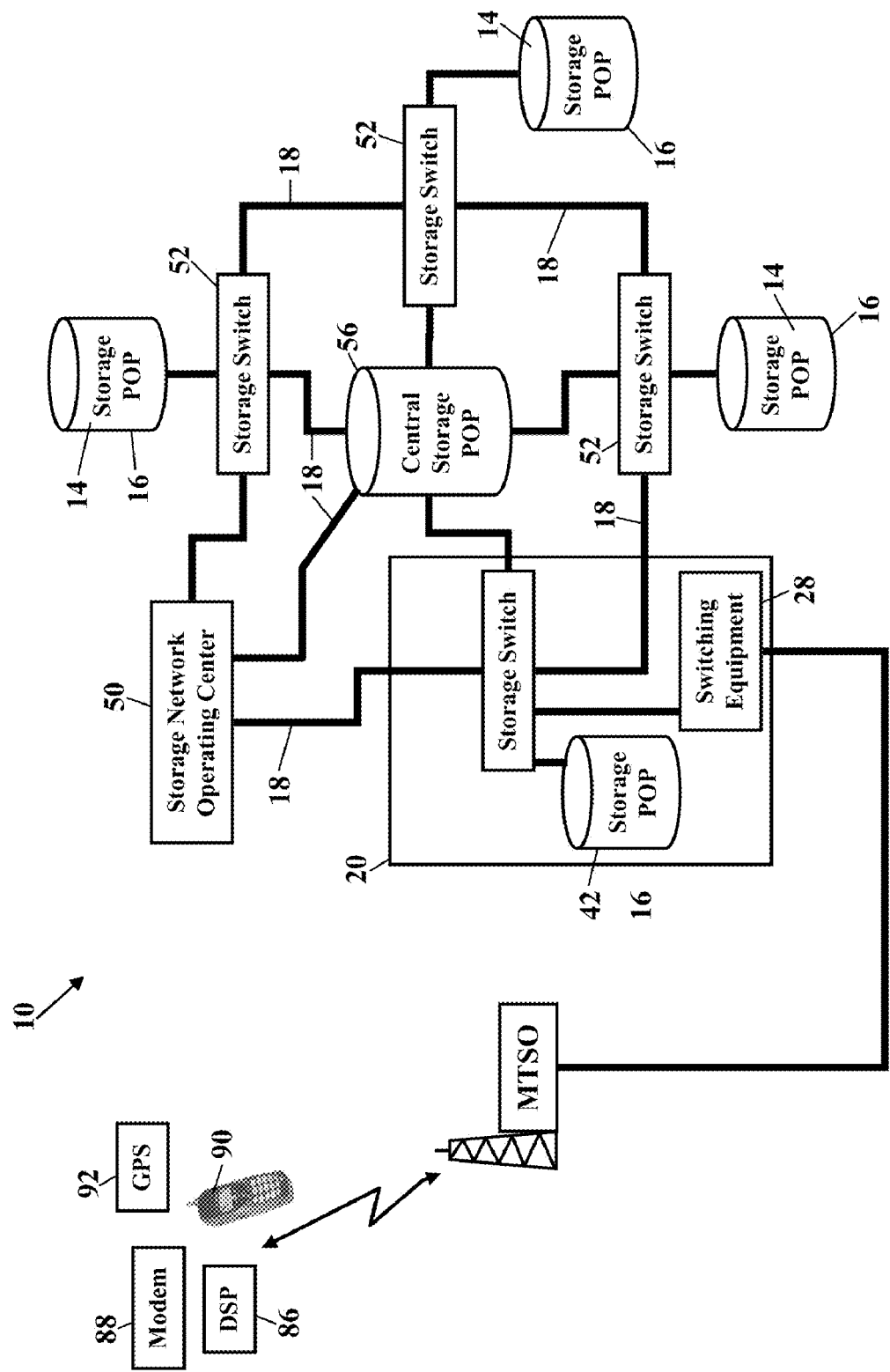

FIGS. 10 and 11 are schematics illustrating the communication of electronic data to other devices. FIG. 10 shows electronic data may be communicated to a device coupled to the data connection 36. As FIG. 10 shows, a device with a digital signal processor (DSP) 86 coupled to the data connection 36 could receive electronic data. The electronic data is communicated from the storage POP 42 to the digital signal processor 86 via the data connection 36. FIG. 10 also shows any device with a modem 88 coupled to the data connection 36 could receive electronic data. The electronic data is communicated from the storage POP 42 to the modem 88 via the data connection 36. FIG. 11 shows electronic data may be wirelessly communicated to any device having the digital signal processor 86 and/or the modem 88. FIG. 11 also shows electronic data may be wirelessly communicated to a satellite phone 90 or to a Global Positioning System ("GPS") device 92 that receives, or that displays, Global Positioning System coordinates.

Figure 12:
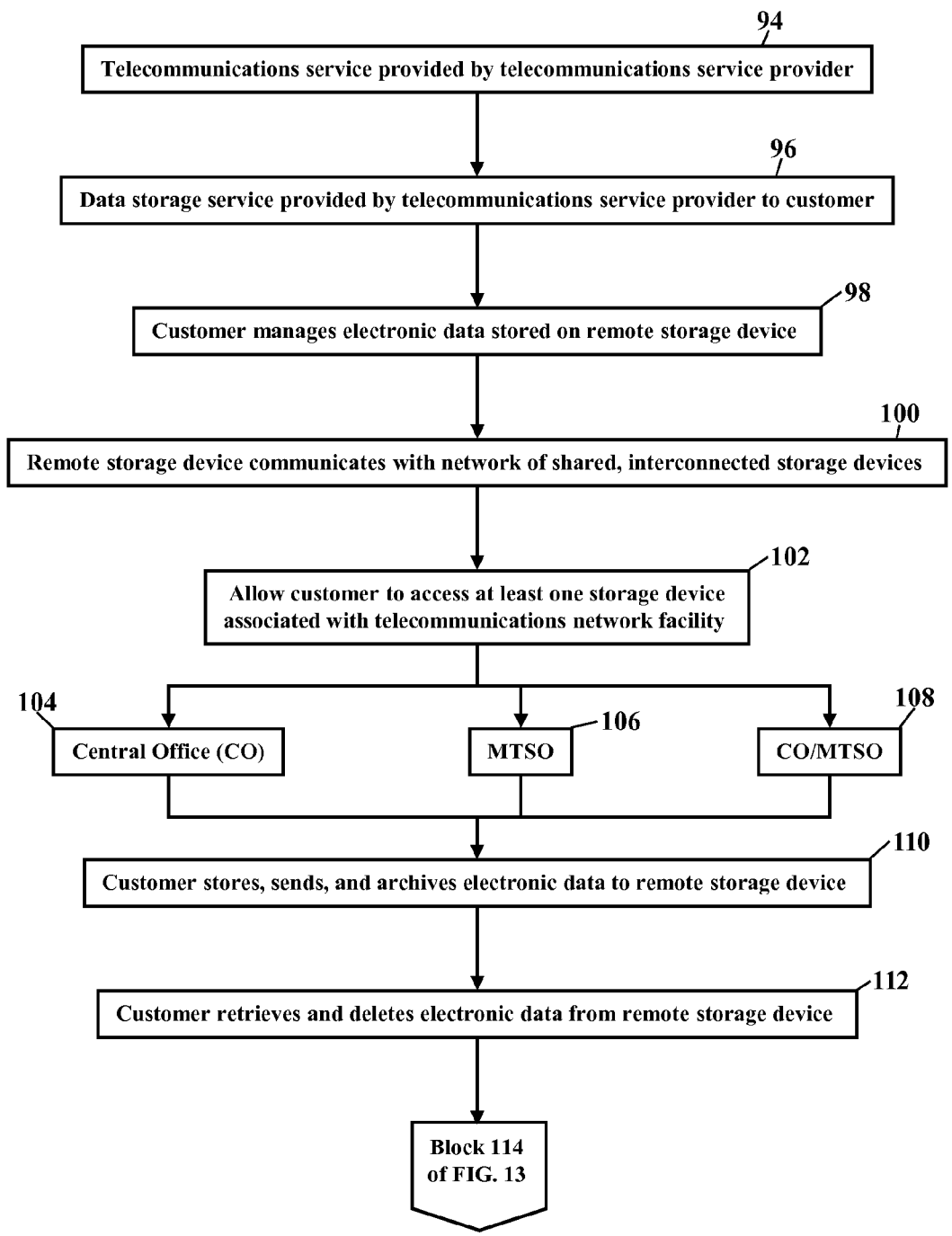
FIGS. 12 and 13 are flowcharts showing a method of providing storage service to a customer.
Figure 13:
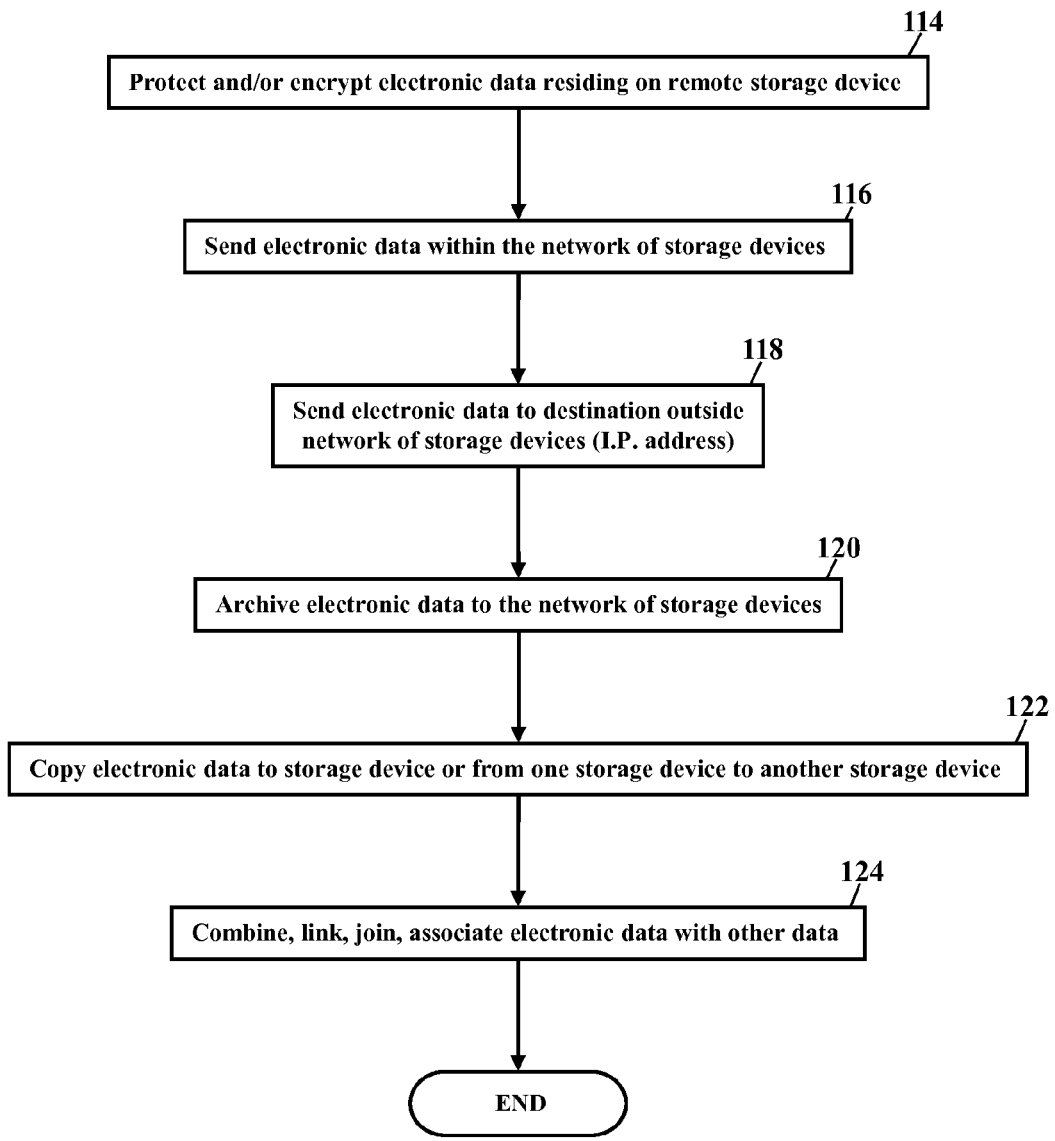

FIGS. 12 and 13 are flowcharts showing a method of providing storage service to a customer. Telecommunications service (Block 94) and data storage service (Block 96) is provided by a telecommunications service provider. The data storage service allows the customer to manage electronic data stored or residing on a remote storage device (Block 98). The remote storage device communicates with a network of shared, interconnected storage devices (Block 100). The data storage service allows the customer to access at least one storage device associated with a telecommunications network facility (Block 102). The at least one storage device, for example, could be associated with a central office (CO) of a telecommunications network (Block 104), a mobile telephone switching office (MTSO) (Block 106), and/or a telecommunications facility comprising telephone switching equipment and mobile telephone switching equipment (CO/MTSO) (Block 108). The data storage service allows the customer to store, send, and archive electronic data to the remote storage device (Block 110). The customer may also retrieve and may delete electronic data from the remote storage device (Block 112).

The flowchart continues with FIG. 13. The data storage service also allows the customer to protect and/or to encrypt electronic data residing on the remote storage device (Block 114). The customer may send electronic data within the network of storage devices (Block 116), and the customer may send electronic data to a destination outside the network of storage devices, such as an Internet Protocol address on a distributed computing network (e.g., the Internet) (Block 118). The data storage service may also allow the customer to archive electronic data to the network of storage devices (Block 120). The customer may copy electronic data to a storage device or copy from one storage device to another storage device (Block 122). The customer may also combine, link, join, or associate electronic data with other data (Block 124).

Figure 14:
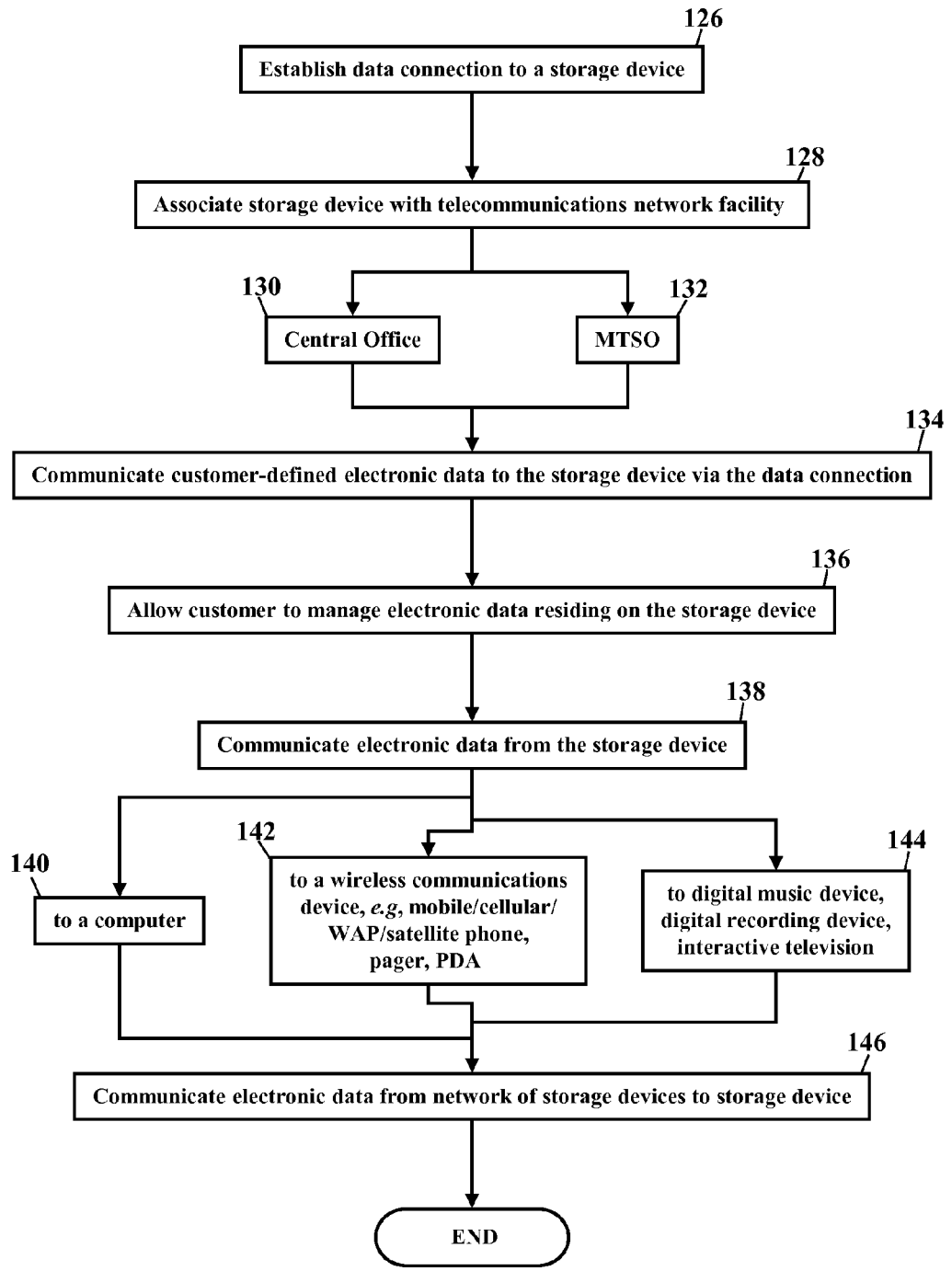
FIG. 14 is a flowchart showing another method of providing storage service to a customer.

FIG. 14 is a flowchart showing another method of providing storage service to a customer. A data connection is established to a storage device (Block 126). The data connection may comprise a landline connection and/or a wireless connection to the storage device. The storage device is associated with a telecommunications network facility (Block 128), such as a central office (CO) (Block 130) and/or a mobile telephone switching office (MTSO) (Block 132). Customer-defined electronic data is communicated to the storage device via the data connection (Block 134). The storage service then allows the customer to manage the electronic data residing on the storage device (Block 136). Electronic data may also be communicated from the storage device (Block 138). Electronic data may be communicated from the storage device to a computer (Block 140). Electronic data may also be communicated from the storage device to a wireless communications device, such as a mobile phone, a cellular phone, a WAP phone, a satellite phone, a pager, and a personal digital assistant (Block 142). Electronic data may also be communicated from the storage device to a digital music device, a digital recording device, or an interactive television (Block 144). Electronic data may also be communicated from the network of storage devices to the storage device (Block 146).

While the present invention has been described with respect to various features, aspects, and embodiments, those skilled and unskilled in the art will recognize the invention is not so limited. Other variations, modifications, and alternative embodiments may be made without departing from the spirit and scope of the present invention.

The invention claimed is:

1. A method, comprising:
   providing a remote data storage service to a subscriber, the remote data storage service comprising a network of shared, interconnected storage devices located in telecommunications central offices, the remote data storage service having a four layered framework comprising:
      a fourth layer comprising a network transport that interconnects a third layer of the framework,
      the third layer comprising a plurality of storage points of presence to communicate archival electronic data along the network of shared, interconnected storage devices, the plurality of storage points of presence interconnected via the network transport to communicate the archival electronic data along the network of shared, interconnected storage devices,
      a second layer comprising a storage operating system that facilitates monitoring and management of the remote data storage service from a storage network operating center, and
      a first layer comprising an application program;
   receiving a selection from the subscriber of a central office in which the archival electronic data will be stored;
   receiving the archival electronic data from the subscriber;
   storing the archival electronic data in a storage point of presence of the plurality of storage points of presence associated with the central office selected by the subscriber; and
   allowing the subscriber to manage the archival electronic data stored in the storage point of presence located within the central office.

2. The method according to claim 1, further comprising archiving the transferring the archival electronic data to another storage point of presence of the plurality of storage points of presence.

3. The method according to claim 1, further comprising archiving the archival electronic data to a mobile telephone switching center.

4. The method according to claim 1, further comprising retrieving a service level agreement.

5. The method according to claim 1, further comprising storing digital content within the central office.

6. The method according to claim 5, further comprising downloading the digital content to the subscriber.

7. A system, comprising:
   a processor executing a software application that causes the processor to:
      provide a remote data storage service to a subscriber, the remote data storage service comprising a network of shared, interconnected storage devices located in telecommunications central offices, the remote data storage service having a four layered framework comprising:
         a fourth layer comprising a network transport that interconnects a third layer of the framework,
         the third layer comprising a plurality of storage points of presence to communicate archival electronic data along the network of shared, interconnected storage devices, the plurality of storage points of presence interconnected via the network transport to communicate the archival electronic data along the network of shared, interconnected storage devices,
         a second layer comprising a storage operating system that facilitates monitoring and management of the remote data storage service from a storage network operating center, and
         a first layer comprising an application program;
      receive a selection from the subscriber of a central office in which the archival electronic data will be stored;
      receive the archival electronic data;
      store the archival electronic data in a storage point of presence of the plurality of storage points of presence associated with the central office selected by the subscriber;
      allow the subscriber to manage the archival electronic data stored in the storage point of presence located within the central office.

8. The system according to claim 7, wherein the software application causes the processor to receive a request for content.

9. The system according to claim 8, wherein the software application causes the processor to retrieve requested content from a central storage.

10. The system according to claim 9, wherein the software application causes the processor to stream the requested content to the subscriber.

11. The system according to claim 7, wherein the software application causes the processor to match stored content to a profile associated with the subscriber.

12. The system according to claim 11, wherein the software application causes the processor to notify the subscriber when the stored content matches the profile.

13. The system according to claim 12, wherein the software application causes the processor to charge a fee when the stored content matches the profile.

14. The system according to claim 7, wherein the software application causes the processor to charge a fee for storing the subscriber data.

15. A method, comprising:
   establishing a data connection over a local loop;
   communicating customer-defined electronic data over the data connection;
   providing a remote data storage service comprising a network of shared, interconnected storage devices located in telecommunications central offices, the remote data storage service having a four layered framework comprising:
      a fourth layer comprising a network transport that interconnects a third layer of the framework,
      the third layer comprising a plurality of storage points of presence to communicate the customer-defined electronic data along the network of shared, interconnected storage devices, the plurality of storage points of presence interconnected via the network transport to communicate the customer-defined electronic data along the network of shared, interconnected storage devices,
      a second layer comprising a storage operating system that facilitates monitoring and management of the remote data storage service from a storage network operating center, and a first layer comprising an application program;

receiving a selection from a customer of a central office in which the customer-defined electronic data will be stored;

storing the customer-defined electronic data in a storage point of presence of the plurality of storage points of presence associated with the central office selected by the customer; and allowing the customer to manage the customer-defined electronic data that is stored on the storage point of presence located within the central office.

16. The method according to claim 15, further comprising transferring the customer-defined electronic data to a different central office.

17. The method according to claim 15, further comprising permitting access to other storage points of presence located in other central offices.

18. The method according to claim 15, further comprising storing digital content to the storage point of presence.

19. The method according to claim 15, further comprising charging a fee for storing the customer-defined electronic data.

* * * * *